S. Reynolds.
Grain Binder.
N° 398
N° 31402
Patented Feb. 12, 1861.
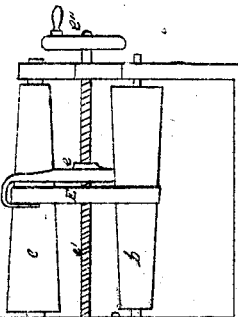
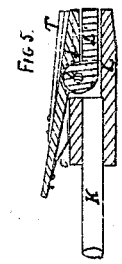
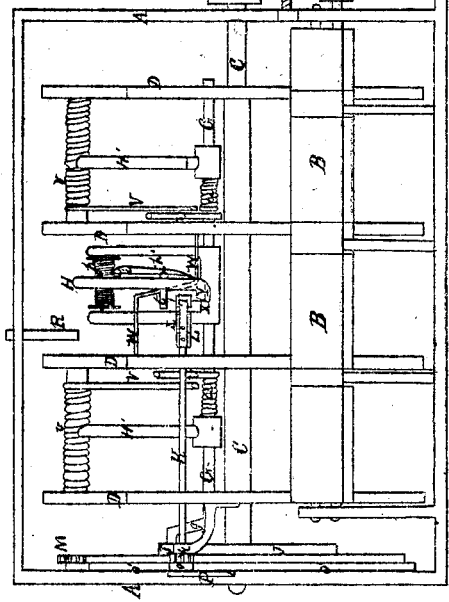
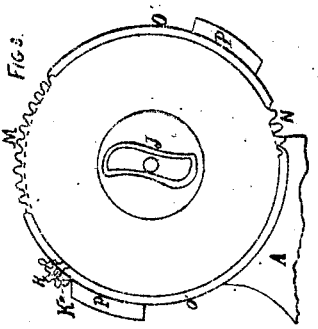
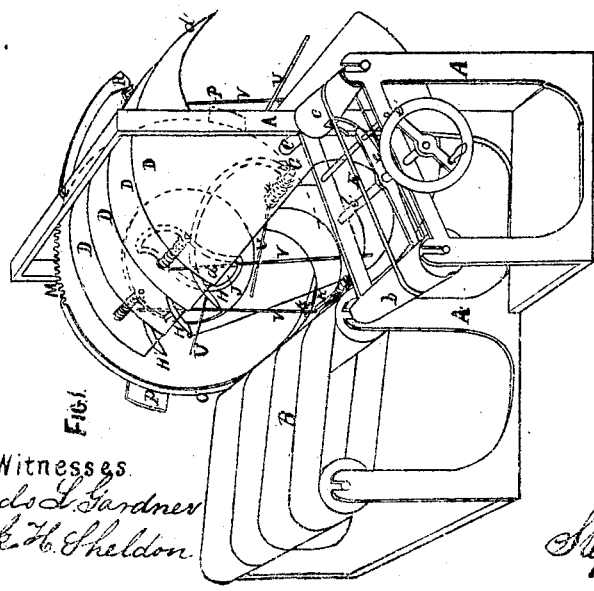
Witnesses
Orlando L. Gardner
Clark H. Sheldon
Inventor
Stephen Reynolds

UNITED STATES PATENT OFFICE.

STEPHEN REYNOLDS, OF RICHMOND, RHODE ISLAND.

IMPROVEMENT IN MACHINES FOR BINDING GRAIN.

*Specification forming part of Letters Patent No. 31,402, dated February 12, 1861.*

*To all whom it may concern:*

Be it known that I, STEPHEN REYNOLDS, of Richmond, in the county of Washington and State of Rhode Island, have invented a new and Improved Machine for Binding Grain; and I do hereby declare that the following is a full, clear, and exact description of the same, reference being had to the accompanying drawings, in which—

Figure 1 is a perspective view of the machine. Fig. 2 is a front elevation. Figs. 3, 4, 5, 6 are views of different parts detached.

Similar letters of reference indicate like parts in all the figures.

To enable others skilled in the art to make and use my invention, I will proceed to describe its construction and operation by the aid of the drawings and of the letters of reference marked thereon.

A is a frame, of proper form to contain the mechanism, supported on wheels or runners, and attached to the frame of a reaper by any convenient means. B is an endless apron or belt, or series of belts, running from behind the cutters of the reaper to the binding mechanism, and serving to convey the grain to the latter as fast as it is cut. C is a shaft, mounted in the frame A, and carrying a series of arms, D, concentric with $c$, from $d$ to $d'$, and forming hooks, as represented, for receiving the grain and supporting it while being bound. I call these arms or hooks the "gatherers," and there may be one or more series of them, as preferred. The shaft C receives its motion from the driving-wheel of the reaper, through a belt, E, and cones $b$ $c$, and its velocity may be varied relatively to the driving-wheel by shifting the place of the belt upon the cones. This is accomplished by means of a shipper, $e$, and screw, $e'$ and hand-wheel $e''$, as shown.

After the grain is formed into bundles by the action of the apron B and the gatherers D, I bind it with an iron wire, supplied from a reel by means of mechanism now to be described.

In the arms or gatherers D, near the shaft C, I mount other shafts, G, one for each series of gatherers. Each of these shafts carries a curved arm, H, furnished with an eye, X, at its end, and a reel of wire, $h$, as represented.

$i$ $i$ are guides for the wire, and $k$ a spring for causing friction upon the wire, to prevent it from being removed from $h$ too freely. The end of $h$ is sharpened, and it acts as a pawl, to prevent the wire from being drawn backward from any cause. The end of H is bent to one side, forming a wedge-shaped projection, Y, through which the eye X passes, as clearly shown in Fig. 4. Other curved arms, H' H', are also attached to G, as represented. The shaft G receives a reciprocating motion twice to each revolution of C by means of an arm or crank, $g$, on the end of each, working into a stationary cam-shaped groove, J, attached to the frame A.

In or near the outer ends of the gatherers D, I hang a short shaft, K, carrying on its inner end a peculiar double griper or jaws. (Shown in Figs. 5 and 6.) The jaw L is stationary, or firmly fixed on the shaft K. L' is hinged to L by the pin $l$, and is forced toward L by a spring, $l'$. L'' is a third or intermediate jaw, attached also to L by the pin $l$, and free to turn thereon, the spring $l'$ keeping it closely pressed between L and L', except when something intervenes.

Anything placed between L and L'', or between L'' and L', will be firmly held, and neither will tend to loosen the grasp upon the others, but, upon pressing on the other end of L', both will be released. The shaft K receives an alternate rotating motion around its own axis, as it revolves around C, by means of a pinion, $k$, on its outer end, and stationary racks or segmental gears M N, attached to the frame A, and is prevented from rotating, except at the proper times, by means of a piece, $o$, of the form represented, and a corresponding stationary circle or cam, O', cutaway at the racks M and N. This shaft K also receives a slight end motion by means of stationary cams P P', attached to O', acting upon its outer end, the spring of D being sufficient to return it to its place when it has passed P or P'. R is another stationary cam, attached to A, and so arranged that as the gripers L L' L'' pass under it it acts upon the tail end of L and opens the jaws.

T, Figs. 5 and 6, is a spring-cutter attached to L', and arranged to act against the edge of L'' in such a manner as to form a shear. It is operated by a wedge or cam shaped piece, t, fixed to the reciprocating arm or wire-carrier H. U U are arms attached loosely to the shaft G, or another shaft near that point, and pressed outward toward the points of D by coiled springs u u. V V are similar arms, attached at the points represented, and likewise pressed outward from the shaft C by coiled springs v v. The tendency of these arms is to contract the size of the space within the gatherers D, and the strength of the springs u v is so graduated that they will give way to a large and heavy bundle, but will partially support a small and light bundle in close proximity to the binding apparatus. W is a guard attached to the two arms D, each side of the gripers L L' L'', bent in the form represented, and so arranged relatively to the gripers and carrier H that the wire, when placed around the bundle, shall draw across W in proper position for receiving the twist.

Having now described the several parts of my machine, I will proceed to describe the operation thereof. The reaper being set in motion, the shaft C revolves in the direction of the arrow, and the grain being brought upon the apron B is stopped by the concentric portion of D, and caused by the motion of both B and D to form into a bundle. The griper-shaft K, in the revolution of D, has been pushed inward by the cam P', so that as the arm H is reciprocated by the cam J its wedge-formed end Y is caused to pass between and through the jaw L L'', leaving the wire from spool h—which is threaded through the eye in the end of H—firmly clutched in that jaw. Before H returns, K has passed P', and springs back out of the path of Y, so that the latter does not open the jaws on its return. As H recedes, therefore, the wire is stretched from L L'' to H, across the opening in D. As K continues its motion with D, the pinion k strikes the rack N, which revolves K one-half a revolution, bringing the other jaw, L' L'', in the circle of motion of H. The parts now continue to revolve until the open space in D comes against the end of the apron B, when the grain which has accumulated there rolls in against the wire stretched from L L'' to H, depressing it until the bundle finds a proper bearing upon the spring-arms U V. As the parts continue to revolve, K is again forced inward by the cam P, and the carrier H is brought down over the bundle by the cam J, carrying the wire completely around the bundle, and, passing through the jaw L' L'', leaves the wire therein, without disturbing the other end thereof, which remains confined in L L''. At this point the wedge or cam t on H strikes the cutter T on L', forcing it down and severing the wire, so that as H retires no wire is stretched therefrom to the gripers. The bundle is now bound by a band of wire, the two ends of which pass over the guard W, and are firmly held by the jaws L L' L''. At this point the pinion k strikes into the rack M, and the gripers receive several revolutions, so twisting the wire as to prevent the ends from separating. The end of L' then strikes against the cam R, which opens the jaws, when the bundle drops out, and the like operation is repeated. Meanwhile the other set of apparatus (if two are used, as represented in the drawing) has been undergoing the same motions, and binds another bundle, thereby binding as many bundles to one revolution of C as there are sets of gatherers D, the stationary cams, racks, &c., serving for each set in succession.

The size of the bundles will vary with the yield of the grain and the speed of C, and, by means of the cones b c and shipping device e e' the speed of C may be graduated to suit all circumstances.

The apparatus for binding above described may be attached to an apron instead of a revolving shaft, with a similar effect; and I can, if I wish, attach a device to the jaws L L' L'' for tying a knot in a string, so as to dispense with the use of wire, without altering the rest of the apparatus.

Having now fully described my improvement, what I claim as new therein, and desire to secure by Letters Patent, is—

1. The revolving gatherers D, in combination with the endless apron B, operating substantially as and for the purpose herein set forth.

2. The reciprocating carrier-arm H, for passing the wire or string first across the opening in D, and then around the bundle, in combination with proper mechanism for holding the ends of the band and fastening the same, substantially as herein set forth.

3. The employment of the double jaws L L' L'', so arranged and operated that one end of the band shall be placed in one jaw, and the other end in the other jaw, by the action of the carrier H, or its equivalent, without disturbing by the latter operation the security of the other end, substantially as and for the purpose above described.

4. Causing the double jaws L L' L'' to make one-half a revolution upon their axis after the wire has been placed in one jaw and before it is placed in the other jaw, substantially as and for the purpose herein specified.

5. Giving the jaws L L' L'' an end motion by means of the stationary cams P P', or equivalent device, for the purpose of bringing them into and removing them from the path of the carrier-arm H, as above set forth.

6. The cutter or shear T, attached to the jaw L' L'', for the purpose of cutting off the wire after it is griped by the said jaw, in combination with the cam or wedge-piece t, or equivalent, substantially as herein specified.

7. Rotating the double jaws L L' L'' by means of the stationary gear or rack M, for the purpose of twisting the ends of the wires and securing the bundle, substantially as herein set forth.

8. The arrangement of the guard W, for holding the wire in the proper position for the action of the twisting device, substantially as specified.

9. The employment of the spring-arms U V, in combination with the gatherers D, for supporting a small bundle in the proper position relatively to the binding devices, substantially as herein set forth.

10. The employment of the stationary cam R, in combination with the jaws L L' L'', for the purpose of relieving the bundle at the proper point, substantially as herein set forth.

11. The employment of the wedge-formed projection Y, pierced by the eye X, on the end of the carrier-arm H, for opening the jaws L L' L'', and depositing the wire therein, substantially as above set forth.

12. The construction and arrangement of the double jaws L L' L'' in the manner shown, so that they are both operated by the single spring l', and are both released by pressing upon the rear end of L', substantially as herein set forth.

In testimony whereof I have hereunto set my name, in the presence of two subscribing witnesses.

STEPHEN REYNOLDS.

Witnesses:
 ORLANDO L. GARDNER,
 CLARK H. SHELDON.